United States Patent
Koike

(10) Patent No.: US 7,887,155 B2
(45) Date of Patent: Feb. 15, 2011

(54) IMAGE RECORDING APPARATUS, CONTROL METHOD FOR IMAGE RECORDING APPARATUS, AND STORAGE MEDIUM STORING CONTROL PROGRAM OF IMAGE RECORDING APPARATUS

(75) Inventor: Haruki Koike, Tokyo (JP)

(73) Assignee: Olympus Corporation, Tokyo (JP)

( * ) Notice: Subject to any disclaimer, the term of this patent is extended or adjusted under 35 U.S.C. 154(b) by 156 days.

(21) Appl. No.: 12/398,502

(22) Filed: Mar. 5, 2009

(65) Prior Publication Data

US 2009/0225114 A1 Sep. 10, 2009

(30) Foreign Application Priority Data

Mar. 7, 2008 (JP) ............................. 2008-057934

(51) Int. Cl.
*B41J 29/393* (2006.01)
(52) U.S. Cl. ................................. 347/19; 347/9; 347/10
(58) Field of Classification Search ...................... 347/4, 347/5, 9–11, 14, 19
See application file for complete search history.

(56) References Cited

FOREIGN PATENT DOCUMENTS

JP 2007-253337 A 4/2007

*Primary Examiner*—Lamson D Nguyen
(74) *Attorney, Agent, or Firm*—Holtz, Holtz, Goodman & Chick, PC

(57) ABSTRACT

An image recording apparatus includes at least: a phase locked loop for generating an ink jet timing control signal determining drive timing when the nozzle array drive unit is controlled to perform the recording process, controlling a frequency of the ink jet timing control signal, and allowing the drive timing to be synchronous with a conveyance distance of the record medium in the conveyance information; and a phase locked loop setting unit for setting information determining a lock range of the phase locked loop in the phase locked loop according to the job information as a condition for determining the drive timing. The image recording apparatus performs the recording process by controlling the nozzle array drive unit with the drive timing determined by the ink jet timing control signal generated by the phase locked loop.

16 Claims, 15 Drawing Sheets

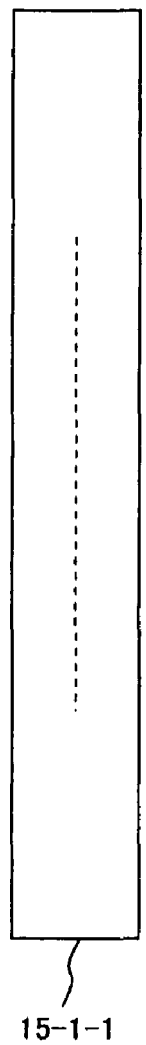
15-1-1
F I G. 8 A

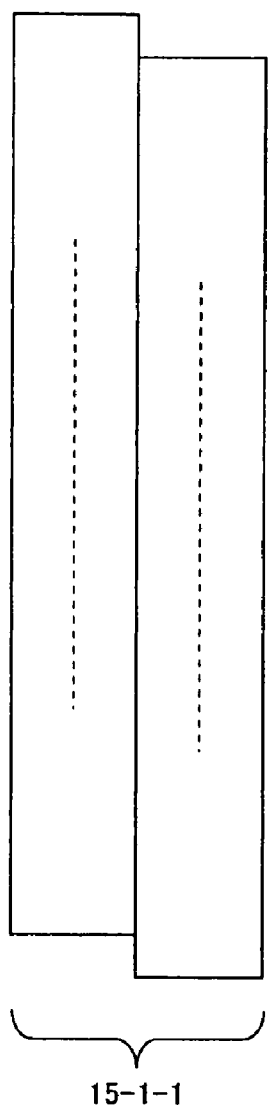
15-1-1
F I G. 8C 15-1-1

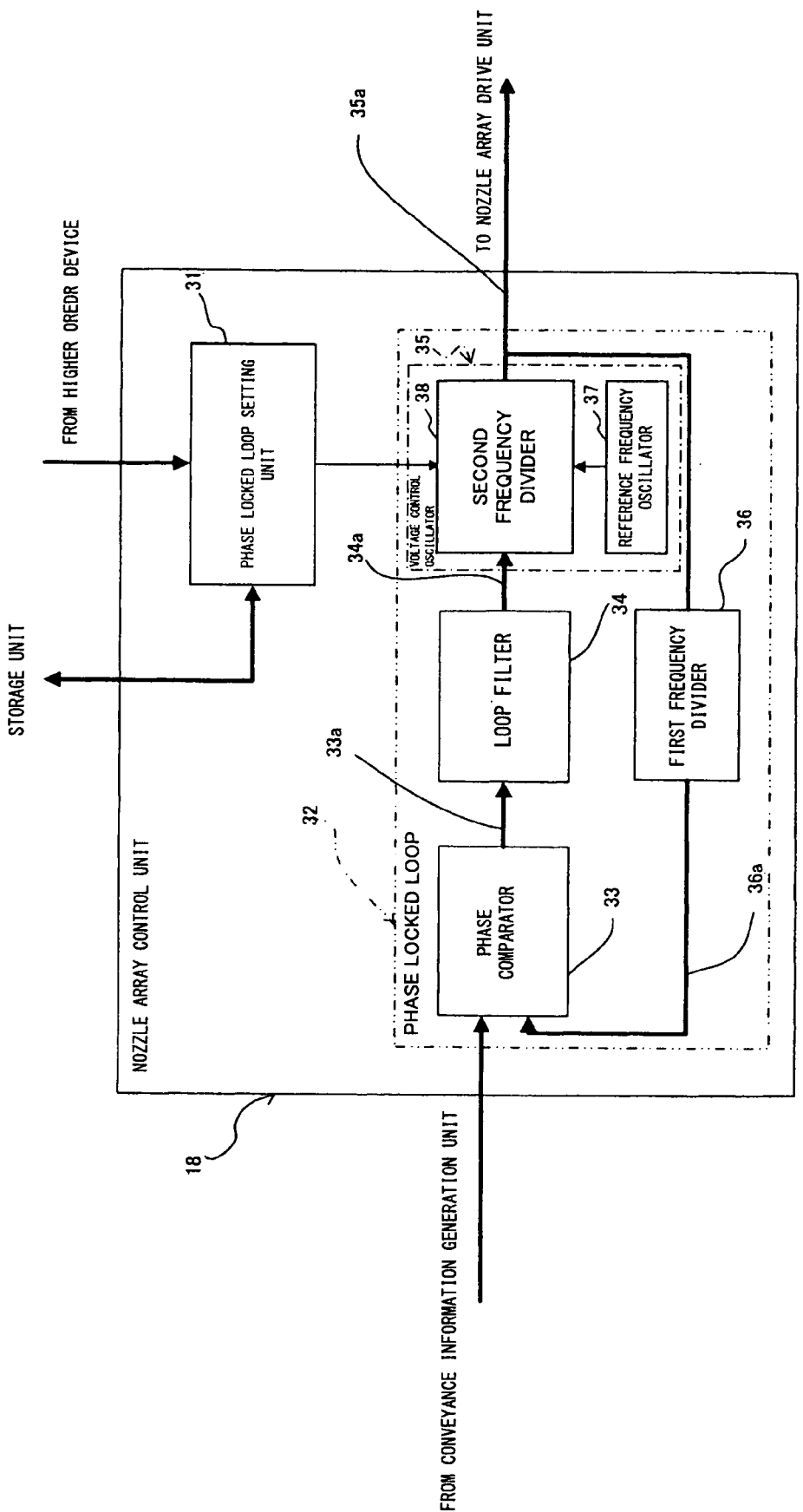
F I G. 9

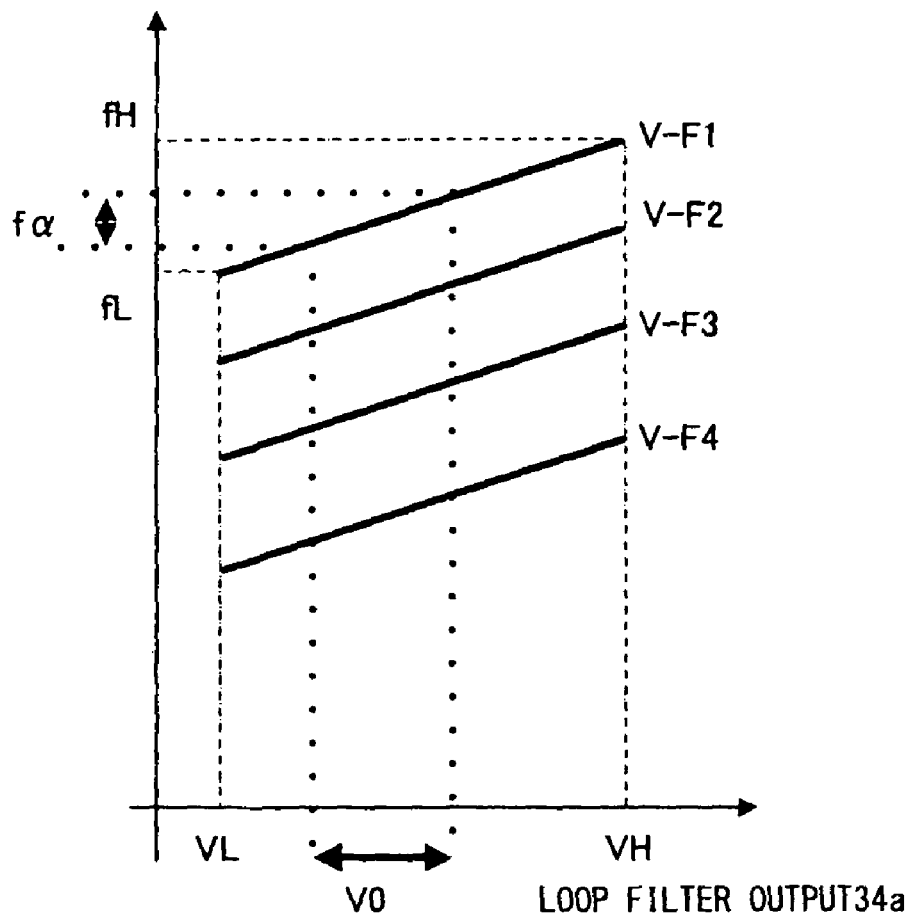
F I G. 1 1

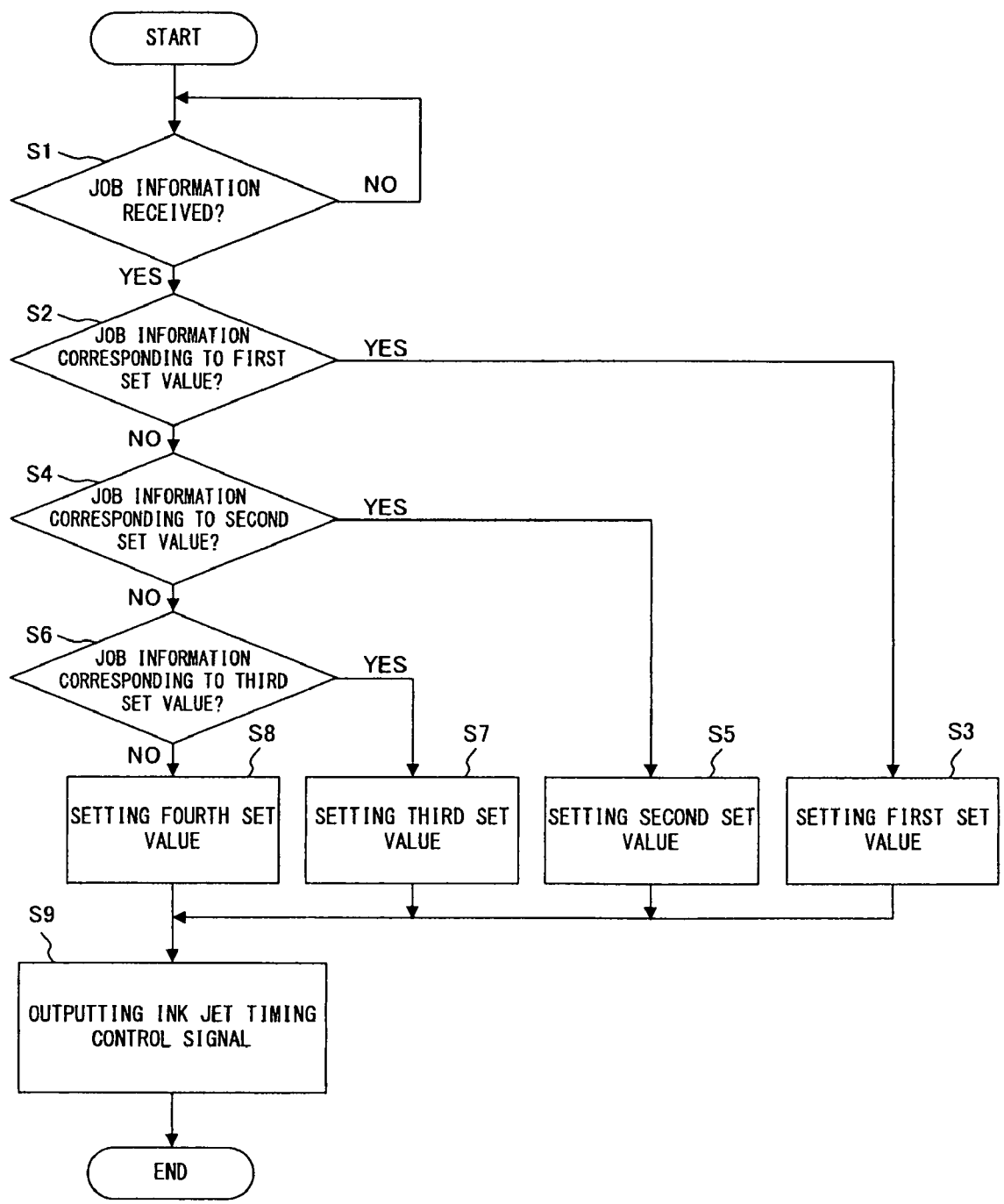
F I G. 1 2

IMAGE RECORDING APPARATUS, CONTROL METHOD FOR IMAGE RECORDING APPARATUS, AND STORAGE MEDIUM STORING CONTROL PROGRAM OF IMAGE RECORDING APPARATUS

CROSS REFERENCE TO RELATED APPLICATIONS

This application claims benefit of Japanese Application No. 2008-57934, filed Mar. 7, 2008, the contents of which are incorporated by this reference.

BACKGROUND OF THE INVENTION

1. Field of the Invention

The present invention relates to image recording technology for recording an image on a record medium such as paper, film, etc., and more specifically to the technology for controlling a recording position according to the conveyance information during conveyance of the record medium on which the image is recorded.

2. Description of the Related Art

For example, a full-line color ink jet system is well known as an image recording apparatus. In the image recording apparatus, a plurality of nozzle arrays for jetting ink are arranged in a direction orthogonal to the conveyance direction (secondary scanning direction) in which a record medium is conveyed and at predetermined intervals in a secondary scanning direction by ink color. With this image recording apparatus, a character and an image are recorded on a record medium arranged opposite the plurality of nozzle arrays by jetting ink of each color from a plurality of nozzle arrays.

Relating to the above-mentioned technology, for example, Japanese Laid-open Patent Publication No. 2007-253337 discloses the nozzle array driving method using a phase locked loop (PLL) for inputting an encoder signal as the technology of controlling the nozzle array of an image recording apparatus. With this technology, a control signal corresponding to the timing of jetting ink is generated by performing control by a phase locked loop corresponding to the conveying speed of the record medium according to the encoder output signal generated corresponding to the amount of conveyance of the record medium.

With the technology, a signal obtained by multiplying the frequency of the output signal of the encoder provided for the conveyance path of the record medium by n (n is a natural number) is generated using the phase locked loop, and an ink jet timing control signal corresponding to each nozzle array is generated using the generated signal. When the value of n is changed, the frequency of the ink jet timing control signal changes with respect to the record medium conveyed at a predetermined speed. Therefore, with the technology, the resolution in the secondary scanning direction in recording an image can be changed.

In addition, with the technology disclosed by the above-mentioned document, the streaky unevenness (appearing in a recorded image) can be suppressed by setting the value of the set value n corresponding to each speed to perform a recording operation at ½ to quadruple speeds with respect to the conveying speed of the record medium.

Described below is the configuration illustrated in FIG. 1. FIG. 1 illustrates the common configuration of a phase locked loop disclosed by the above-mentioned document.

A phase locked loop 41 is configured by a phase comparator 42, a loop filter 43, a voltage control oscillator 44, and a frequency divider 45.

The phase comparator 42 detects a phase shift between the pulse signal of an encoder as a pulse interval corresponding to the conveying speed of a record medium (conveyance distance per unit time) and a feedback signal 45a obtained by feeding back a clock signal 44a as the output of the phase locked loop 41 through the frequency divider 45. A signal 42a indicating the phase shift can be converted into a loop filter output 43a as a signal of a voltage value corresponding to the level of the advance/delay of the phase by passing through the loop filter 43.

The voltage control oscillator 44 outputs the clock signal 44a of the frequency corresponding to the voltage value of the loop filter output 43a. The frequency divider 45 outputs the feedback signal 45a obtained by frequency-dividing the clock signal 44a output from the voltage control oscillator 44 to the phase comparator 42.

The ink jet timing is determined by the clock signal 44a output of the voltage control oscillator 44. The clock signal 44a is a signal synchronous to the conveying speed of a record medium and, according to the dividing ratio set value n of the frequency divider 45, the clock signal 44a is obtained as a signal of an n-time frequency of the pulse signal generated by the encoder.

Described below is the configuration illustrated in FIG. 2. FIG. 2 illustrates an ideal ink jet timing control signal (of the same frequency as the clock signal 44a illustrated in FIG. 1) when the conveying speed of a record medium is predetermined. Thus, it is desired that the ink jet timing control signal has a stable period T. In this example, the rising edge of the ink jet timing control signal is used for the drive timing of a nozzle array.

Described below is the example illustrated in FIG. 3. FIG. 3 illustrates an example of the V-F characteristic (voltage to frequency characteristic) of the voltage control oscillator 44.

The frequencies of the clock signal 44a output from the voltage control oscillator 44 are higher and lower than the target frequency Ft by the voltage of the loop filter output 43a as illustrated in FIG. 3. If the frequency of the clock signal 44a is thus shifted from the target frequency Ft, there occurs an error in the ink jet timing. The fluctuation of the period corresponding to the shift of the frequency is generally referred to as a jitter.

The range from fL to fH illustrated in FIG. 3 refers to the range of the frequency at which the voltage control oscillator 44 can output a signal of a stable frequency with respect to the voltage change range of the loop filter output 43a, and it is generally referred to as a lock range of the phase locked loop 41. FIG. 3 illustrates a signal of the frequency fL output when the lowest voltage VL of the loop filter output 43a is input to the voltage control oscillator 44, and a signal of the frequency fH output when the highest voltage VH of the loop filter output 43a is input to the voltage control oscillator 44.

Described next is the concept illustrated in FIG. 4. FIG. 4 illustrates the concept of the correlation among the signal waveforms of the units of the phase locked loop 41 illustrated in FIG. 1.

In FIG. 4, part (a) indicates by broken lines the waveform of a pulse signal input to the phase locked loop 41, and illustrates by solid lines the waveform of the feedback signal 45a. Part (b) indicates the waveform of the signal 42a of the phase comparator 42 at this time. Part (c) indicates the waveform of the loop filter output 43a at this time.

In FIG. 4, the waveform of part (a) indicates the phase delay of the rising edge of the feedback signal 45a by ΔT ($\Delta T0, \Delta T1, \Delta T2, \ldots$) with respect to the encoder signal. Since the value of $\Delta T$ ($\Delta T0, \Delta T1, \Delta T2, \ldots$) is different, the feedback signal 45a includes a jitter component.

The phase comparator 42 outputs a pulse signal of a pulse width $\Delta T$ ($\Delta T0, \Delta T1, \Delta T2, \ldots$) corresponding to the phase delay as the output signal 42a as indicated by part (b). The loop filter 43 outputs as the loop filter output 43a the voltage fluctuating up and down from the reference voltage by the $\Delta A$ ($\Delta V0, \Delta V1, \Delta V2, \ldots$) corresponding to the pulse signal as the output signal 42a as indicated by part (c). The V0 in part (c) indicates the voltage fluctuation range of the loop filter output 43a generated by the jitter component included in the feedback signal 45a indicated by part (a).

FIG. 3 further illustrates the frequency fluctuation $\Delta f$ ($\Delta f0, \Delta f1, \Delta f2, \ldots$) of the output signal (that is, the clock signal 44a) of the voltage control oscillator 44 generated by the voltage fluctuation $\Delta V$ ($\Delta V0, \Delta V1, \Delta V2, \ldots$) of the loop filter output 43a. F$\alpha$ illustrated in FIG. 3 indicates the frequency fluctuation range of the output signal (that is, the clock signal 44a) of the voltage control oscillator 44 when the voltage fluctuation range of the loop filter output 43a is V0. That is, the jitter component included in the feedback signal 45a indicated by part (a) illustrated in FIG. 4 generates the frequency fluctuation over the range of F$\alpha$ on the clock signal 44a.

In FIG. 3, the relationship between the voltage fluctuation range V0 of the loop filter output 43a and the frequency fluctuation range F$\alpha$ of the output signal (that is the clock signal 44a) of the voltage control oscillator 44 is determined by the tilt of the straight line indicating the V-F characteristic of the voltage control oscillator 44. When the voltage range (from VL to VH in FIG. 3) of the loop filter output 43a is fixed, and if the lock range (from fL to fH in FIG. 3) of the voltage control oscillator 44 is wide, the tilt of the straight line indicating the V-F characteristic is high. At this time, the frequency fluctuation range F$\alpha$ of the output signal (that is, the clock signal 44a) of the voltage control oscillator 44 with respect to the voltage fluctuation range V0 of the loop filter output 43a becomes wide. The fluctuation of the frequency is generated by the jitter component of the feedback signal 45a.

Thus, the jitter component of the clock signal 44a increases when the lock range of the voltage control oscillator 44 becomes wider, which expands the shift of the recording position on the record medium.

However, in the technology disclosed by the Japanese Laid-open Patent Publication No. 2007-253337, the lock range of the phase locked loop 41 illustrated in FIG. 1 is set wide to correspond to the change of the conveying speed of the record medium of ½ through quadruple conveying speed.

SUMMARY OF THE INVENTION

An image recording apparatus according to an aspect of the present invention includes a conveyance mechanism for generating the conveyance information about a record medium when the record medium is conveyed, and at least one recording unit obtained by providing at least one nozzle array formed in the direction orthogonal to the conveyance direction of the record medium using a plurality of nozzles, and performs a recording process by a nozzle array drive unit of the recording unit driving the plurality of nozzles to jet ink. The apparatus further includes: a phase locked loop for generating an ink jet timing control signal determining the drive timing of the nozzle array drive unit according to notified job information, controlling the frequency of the ink jet timing control signal, and allowing the drive timing to be synchronous with the conveyance distance of the record medium in the conveyance information; and a phase locked loop setting unit for setting the information determining the lock range of the phase locked loop in the phase locked loop according to the job information as the condition for determining the drive timing. With the configuration, the recording process is performed by controlling the nozzle array drive unit with the drive timing determined by the ink jet timing control signal generated by the phase locked loop.

Another aspect of the present invention is a control method for an image recording apparatus that includes a conveyance mechanism for generating the conveyance information about a record medium when the record medium is conveyed, and at least one recording unit obtained by providing at least one nozzle array formed in the direction orthogonal to the conveyance direction of the record medium using a plurality of nozzles, and performs a recording process by a nozzle array drive unit of the recording unit driving the plurality of nozzles to jet ink. The image recording apparatus further includes a phase locked loop for controlling the nozzle array drive unit, generating an ink jet timing control signal for determining the drive timing when the recording process is performed, controlling the frequency of the ink jet timing control signal, and allowing the drive timing to be synchronous with the conveyance distance of the record medium in the conveyance information. The method includes: setting in the phase locked loop a generating condition when the phase locked loop generates the ink jet timing control signal according to notified job information; and controlling the nozzle array drive unit to perform the recording process with the drive timing determined by the ink jet timing control signal generated by the phase locked loop.

A storage medium according to another aspect of the present invention stores a program used to direct an arithmetic operation device to perform control of an image recording apparatus that includes a conveyance mechanism for generating the conveyance information about a record medium when the record medium is conveyed, and at least one recording unit obtained by providing at least one nozzle array formed in the direction orthogonal to the conveyance direction of the record medium using a plurality of nozzles, and performs a recording process by a nozzle array drive unit of the recording unit driving the plurality of nozzles to jet ink. The image recording apparatus further includes a phase locked loop for controlling the nozzle array drive unit, generating an ink jet timing control signal for determining the drive timing when the recording process is performed, controlling the frequency of the ink jet timing control signal, and allowing the drive timing to be synchronous with the conveyance distance of the record medium in the conveyance information. The program directs the arithmetic operation device to perform the process including: setting in the phase locked loop a generating condition when the phase locked loop generates the ink jet timing control signal according to notified job information; and controlling the nozzle array drive unit to perform the recording process with the drive timing determined by the ink jet timing control signal generated by the phase locked loop.

BRIEF DESCRIPTION OF THE DRAWINGS

The present invention will be more apparent from the following detailed description when the accompanying drawings are referenced.

FIG. 8A illustrates the first example of the configuration of a nozzle array;

FIG. 8C illustrates the third example of the configuration of a nozzle array;

FIG. 9 is a block diagram of the configuration of the function of the nozzle array control unit;

FIG. 11 illustrates an example of the correspondence between a voltage value of the output of a loop filter and the frequency of the output of a voltage control oscillator; and FIG. 12 is a flowchart of the contents of the control process performed by a control unit.

DESCRIPTION OF THE PREFERRED EMBODIMENTS

The embodiments of the present invention are described below with reference to the attached drawings.

In the description below, the conveyance direction of the record medium is defined as the y direction or the secondary scanning direction, the direction orthogonal to the conveyance direction is the x direction or the primary scanning direction, and the direction orthogonal to both x and y is defined as the z direction.

Figure 5:
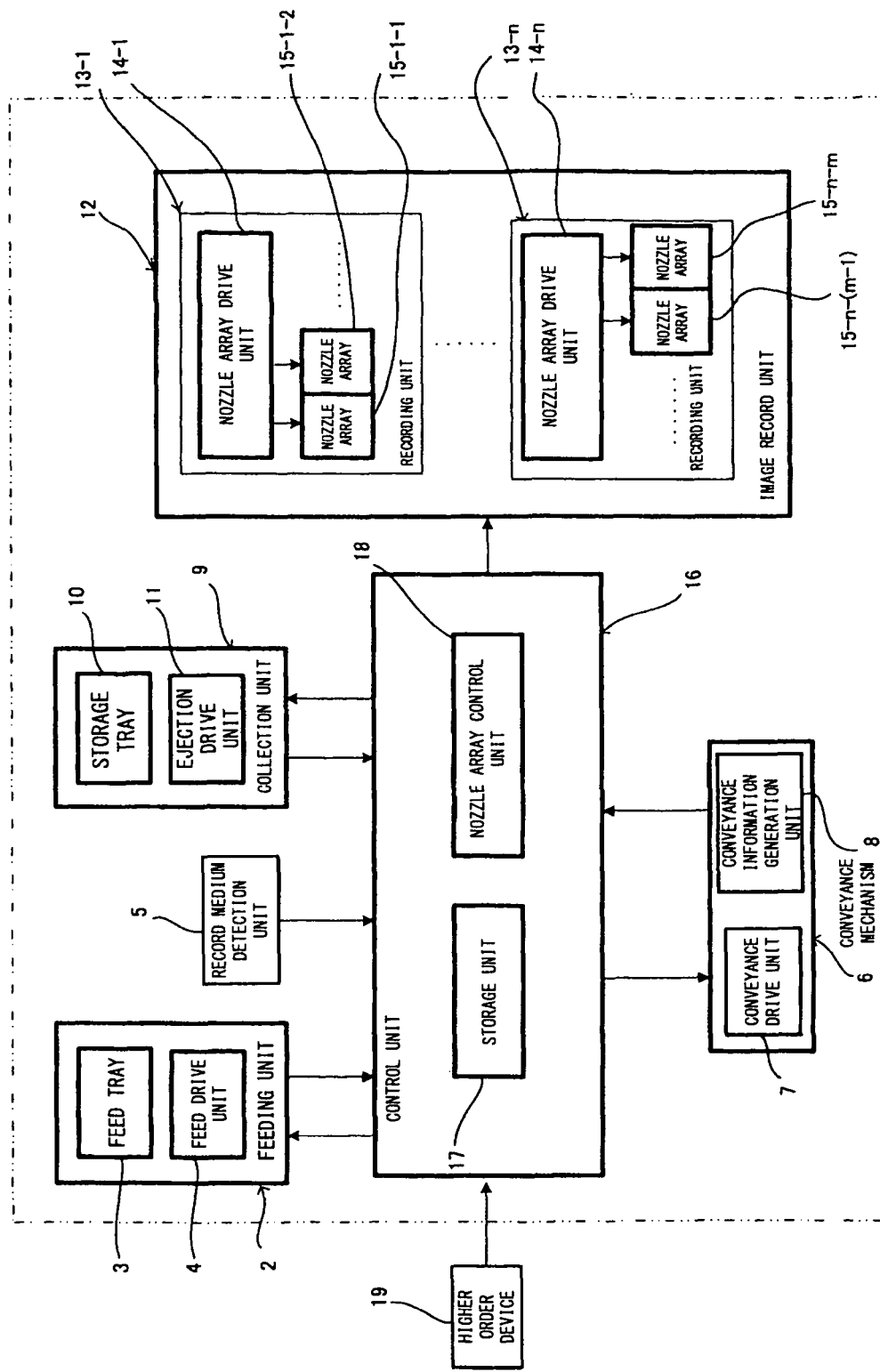
FIG. 5 illustrates the configuration of a conceptual block diagram of the image recording apparatus according to an embodiment of the present invention.
Figure 6:
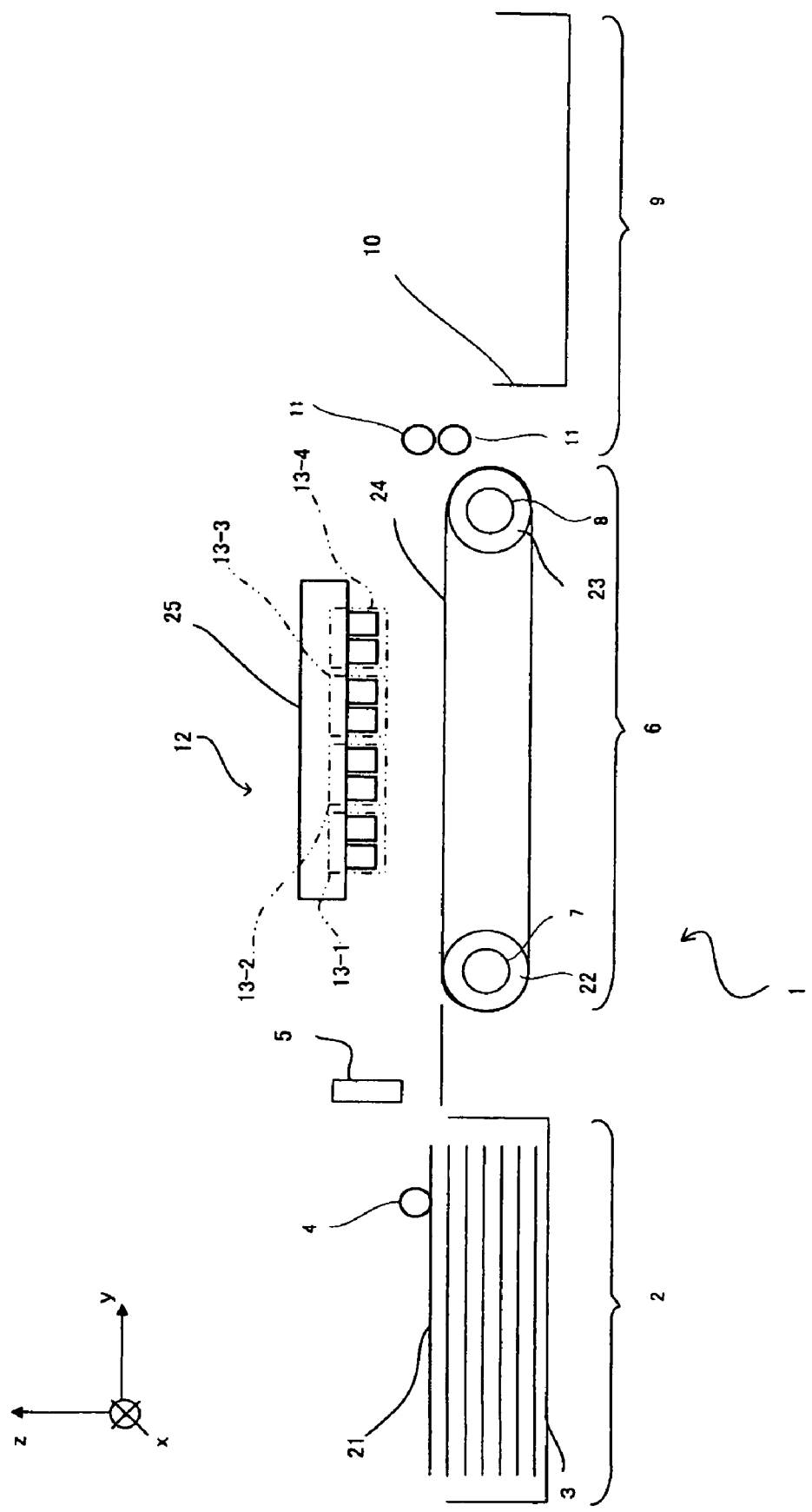
FIG. 6 illustrates an example of the arrangement of the image recording apparatus according to an embodiment of the present invention.

FIG. 5 illustrates the configuration of a conceptual block diagram of the image recording apparatus according to an embodiment of the present invention. FIG. 6 illustrates an example of the arrangement of the image recording apparatus according to an embodiment of the present invention.

First, the configuration of an image recording apparatus 1 according to an embodiment of the present invention is described below.

The image recording apparatus 1 includes a feeding unit 2, a record medium detection unit 5, a conveyance mechanism 6, a collection unit 9, an image record unit 12, and a control unit 16. The feeding unit 2 feeds and conveys a record medium 21. The record medium detection unit 5 is provided upstream from the conveyance mechanism 6 in the conveyance path of the record medium 21, and detects, for example, the edge of the record medium 21. The conveyance mechanism 6 conveys the record medium 21 received from the feeding unit 2. The collection unit 9 ejects and stores the record medium 21 on which an image is recorded. The image record unit 12 performs a recording process for recording an image while the record medium 21 is conveyed on the conveyance path. The control unit 16 controls the entire image recording apparatus 1.

Next, each component of the image recording apparatus 1 is further described below.

The feeding unit 2 is provided with a feed tray 3 and a feed drive unit 4. The feed tray 3 stores the record medium 21, and is configured by a so-called feed cassette etc. The feed drive unit 4 touches the record medium 21 and picks up the medium stored on the feed tray 3 piece by piece from the top, and feeds it to the conveyance mechanism 6, and is configured by, for example, a feed roller. The feeding unit 2 feeds the record medium stored on the feed tray 3 to the conveyance mechanism 6.

The record medium detection unit 5 detects, for example, the edge of the record medium 21 in the secondary scanning direction, and can be configured by providing any of an optical transmission sensor, an optical reflective sensor, a static capacitive sensor, etc.

The conveyance mechanism 6 is configured by a driving roller 22 and a driven roller 23 separated from each other in the secondary scanning direction, a conveyance drive unit 7 connected to the rotation axis of the driving roller 22, a conveyance information generation unit 8 connected to the rotation axis of the driven roller 23, an endless conveyance belt 24, and at least one suction fan not illustrated in the attached drawings. As illustrated in FIG. 6, the endless conveyance belt 24 is mounted as rotatable and opposite the ink outlet of recording units 13-1 through 13-n (n is an integer of 2 or more) having at least one conveyance surface, and conveys the record medium 21. The driving roller 22 is driven by the conveyance drive unit 7, and rotates the endless conveyance belt 24. The driven roller 23 is rotated through the endless conveyance belt 24. The conveyance information generation unit 8 is configured by providing, for example, a rotary encoder, outputs a pulse signal as the conveyance information about the record medium 21 with the rotation of the conveyance belt 24, and outputs the signal to the control unit 16. That is, the pulse signal indicates the conveyance distance of the record medium 21. The suction fan not illustrated in the attached drawings generates a negative pressure by an instruction of the control unit 16, and adsorbs the record medium 21 on the conveyance belt 24.

The collection unit 9 is configured by, for example, a storage tray 10 and an ejection drive unit 11. The storage tray 10 stores the ejected record medium 21, and is configured by a so-called collection tray etc. The ejection drive unit 11 ejects the record medium 21 conveyed by the conveyance mechanism 6, and is configured by, for example, an ejection roller pair.

The image record unit 12 is provided with at least one of the recording units 13-1 through 13-n. The recording units 13-1 through 13-n have at least one of nozzle arrays 15-1-1 through 15-n-m (m is an integer of 2 or more) and at least one of nozzle array drive units 14-1 through 14-n, and supported by a support member 25.

Pluralities of nozzles for jetting ink are linearly formed on the nozzle arrays 15-1-1 through 15-n-m. The nozzle arrays 15-1-1 through 15-n-m are mounted in the primary scanning direction by spanning the length over the maximum width of the record medium 21 on the basis of the design of the image recording apparatus 1, jet ink drops from the plurality of nozzles according to the drive signal by the nozzle array drive units 14-1 through 14-n, and perform the recording process on the record medium 21.

The nozzle array drive units 14-1 through 14-n output the drive signal for drive of each nozzle to the nozzle arrays 15-1-1 through 15-n-m according to the control signal transmitted according to the record data information from the control unit 16.

The image record unit 12 is further described below.

Figure 7:
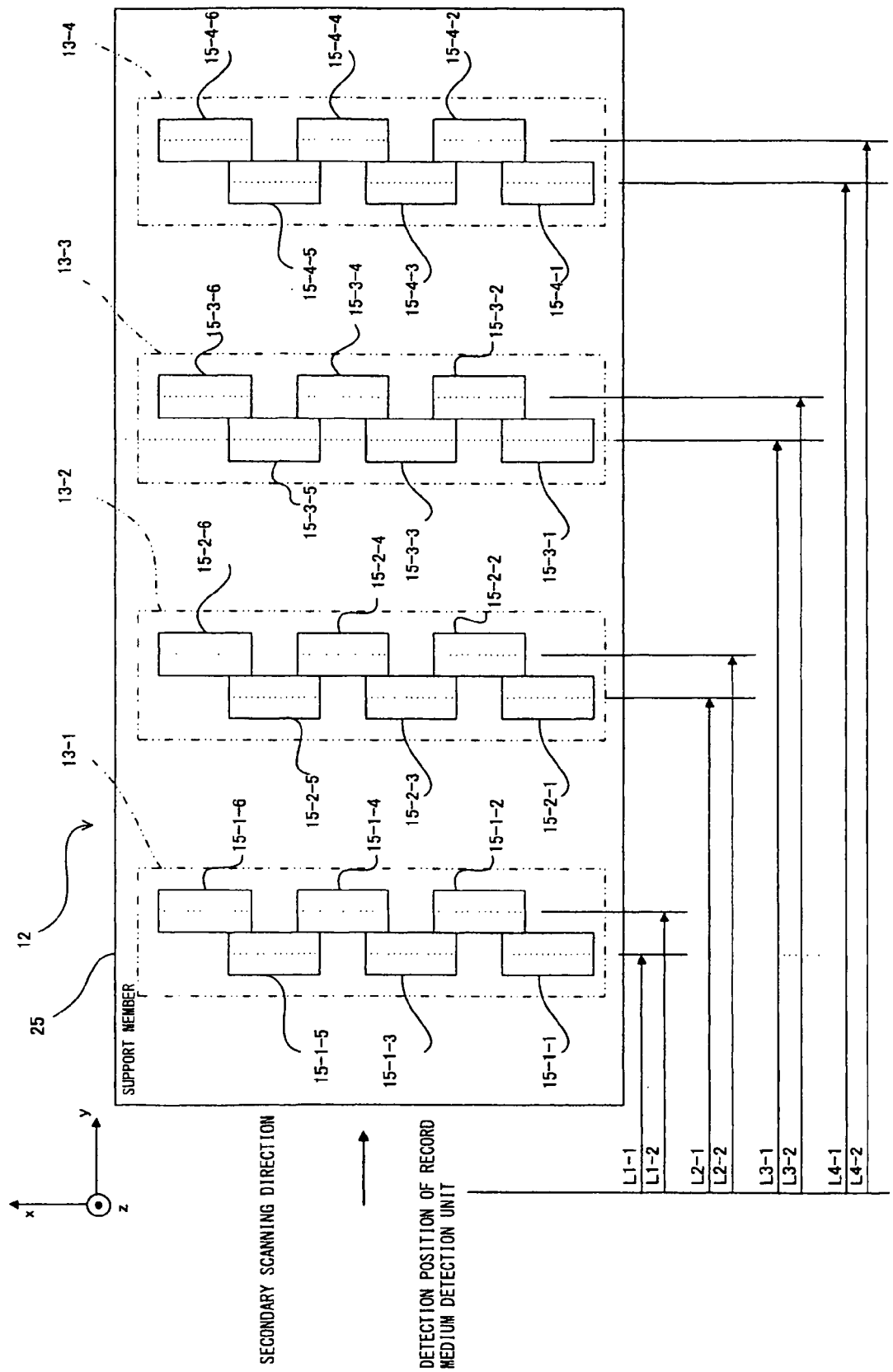
FIG. 7 illustrates an example of the configuration of the arrangement of a nozzle array according to an embodiment of the present invention.

The recording units 13-1 through 13-n is configured by arranging the plurality of nozzle arrays 15-1-1 through 15-n-m as illustrated in, for example, FIG. 7. In FIG. 7, the recording units 13-1 through 13-4 are arranged corresponding to four colors of ink, and six nozzle arrays 15-1-1 through 15-4-6 are arranged for each color. The six nozzle arrays 15-1-1 through 15-4-6 for each color are arranged so that they can be alternately mounted before and after the conveyance path of the record medium 21 and a part of them can overlap including the end portions of the adjacent arrays as viewed from the secondary scanning direction. In the example of the configuration illustrated in FIG. 7, each of the nozzle arrays 15-1-1 through 15-4-6 is separately arranged.

The recording units 13-1 through 13-4 of each color are mounted separately in the secondary scanning direction, and the recording process is performed on the record medium 21 by driving each of the nozzle arrays 15-1-1 through 15-4-6 with the timing corresponding to the position before and after on the conveyance path. That is, in the recording unit 13-1, when the edge of the record medium 21 is conveyed to the position L1-1 after the edge portion of the record medium 21 is detected by the record medium detection unit 5, the recording process is performed by the nozzle arrays 15-1-1, 15-1-3, and 15-1-5, and then the recording process is performed by the nozzle arrays 15-1-2, 15-1-4, and 15-1-6 when the edge is conveyed to the position L1-2. The nozzle arrays 15-1-1 through 15-4-6 record one line of each color of an image in the operation.

When a movement is performed from the detection by the record medium detection unit 5 to each of the distances L1-1 through L4-2, each movement distance from the detection position to each or the positions L1-1 through L4-2 about the edge portion of the record medium 21 is generated as conveyance information by the conveyance information generation unit 8. The conveyance information is the number of pulse signals corresponding to the conveyance distance of the record medium 21 generated by the rotary encoder in the conveyance information generation unit 8. Therefore, whether or not a movement of the record medium 21 has been made to each of the distances L1-1 through L4-2 is determined by counting the number of pulse signals, and comparing the values with the respective count values corresponding to the distances L1-1 through L4-2 stored in advance in the storage unit 17.

Figure 8B:
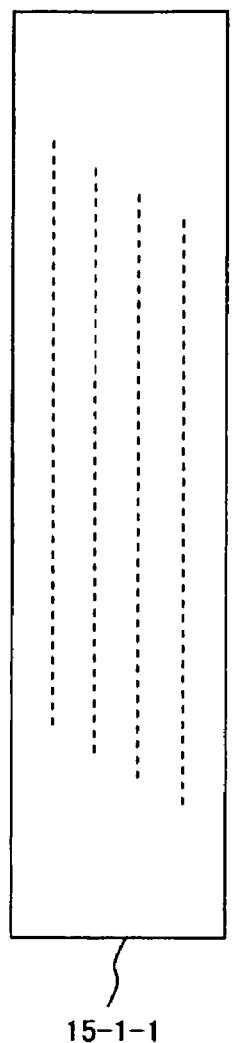
FIG. 8B illustrates the second example of the configuration of a nozzle array.
Figure 8D:
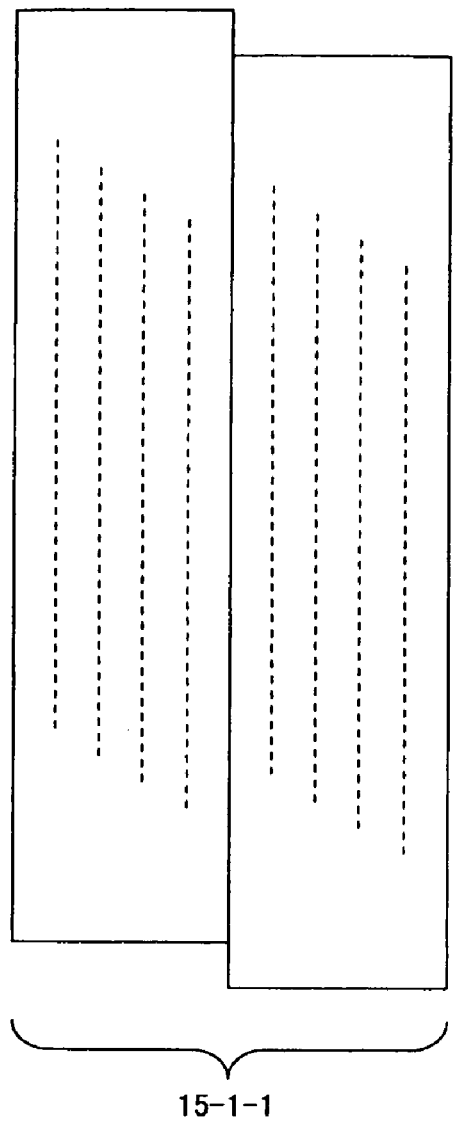
FIG. 8D illustrates the fourth example of the configuration of a nozzle array.

Each of the nozzle arrays 15-1-1 through 15-n-m can also be configured as illustrated in FIGS. 8A, 8B, 8C, and 8D for the nozzle array 15-1-1. FIG. 8A illustrates an example of the configuration of arranging one nozzle array. FIG. 8B illustrates an example of providing a plurality of nozzle arrays in the secondary scanning direction with each array shifted in the primary scanning direction, thereby improving the resolution in the primary scanning direction. FIG. 8C illustrates an example of overlapping the nozzle arrays illustrated in FIG. 8A with each array shifted in the primary scanning direction. FIG. 8D illustrates an example of overlapping a plurality of nozzle arrays illustrated in FIG. 8B with each array shifted in the primary scanning direction. When the configurations of the nozzle arrays illustrated in FIGS. 8A through 8D are adopted, the determination of each distance L is made for each nozzle array.

The nozzle array drive units 14-1 through 14-n selects a nozzle to be driven according to the record information from a higher order device 19, and jets ink when the nozzle is determined by the ink jet timing control signal generated by a nozzle array control unit 18 of the control unit 16.

The control unit 16 controls each of the feeding unit 2, the conveyance mechanism 6, the collection unit 9, and the image record unit 12 to perform the recording process (recording an image) on the record medium 21. The control unit 16 includes at least a process circuit not illustrated in the attached drawings, the storage unit 17, and the nozzle array control unit 18. The process circuit includes, for example, a micro processor unit (MPU) in the arithmetic operation device having a controlling function and an arithmetic function. The storage unit 17 stores a control program, set value relating to the control of the device, and image record information. The nozzle array control unit 18 controls the nozzle arrays 15-1-1 through 15-n-m on the basis of the set value read from the storage unit 17. The control unit 16 controls each component of the image recording apparatus 1 by the MPU reading and executing the control program from the storage unit 17, and provides the function as the nozzle array control unit 18 for controlling the ink jet timing of the nozzle arrays 15-1-1 through 15-n-m.

The storage unit 17 is configured by read only memory (ROM) as a storage medium storing a control program, random access memory (RAM) as work memory of the MPU, and nonvolatile memory storing the specification information about the recording process including record data.

The nozzle array control unit 18 controls the ink jet timing according to the job information from the higher order device 19, and controls of determining the record position in the secondary scanning direction when the recording process is performed on the record medium 21. In the present embodiment, the ink jet timing control signal is generated on the basis of the job information and the set value corresponding to the job information stored in advance in the storage unit 17.

The higher order device 19 corresponds to a computer operated by a user performing the recording process on the image recording apparatus 1 according to the present embodiment. The higher order device 19 is connected as external equipment of the image recording apparatus 1 according to the present embodiment through, for example, a local area network (LAN) etc., and notifies the image recording apparatus 1 according to the present embodiment of the job information as the information about the recording process. The job information includes the image record information when the recording process is performed on the record medium 21 and the specification information about the number of pieces of the record media 21 on which the recording process is performed. In the information, the image record information includes the resolution, the density, the color information, etc. about a recorded image. When the control unit 16 of the image recording apparatus 1 receives the job information notified from the higher order device 19, the unit stores the job information as recording process (image recording) specification information in the storage unit 17.

Next, the conveying operation and the recording process of the record medium 21 in the image recording apparatus 1 according to the present embodiment are described below in detail.

When the control unit 16 receives an instruction to start the recording process from the higher order device 19, the unit controls the conveyance drive unit 7 of the conveyance mechanism 6 and starts rotating the conveyance belt 24. Next, the control unit 16 controls the feed drive unit 4 of the feeding unit 2, picks up the record medium 21 piled on the feed tray 3 piece by piece, and passes and conveys the medium to the conveyance mechanism 6.

The edge of the record medium 21 conveyed on a conveyance path is detected by the record medium detection unit 5. Then, the record medium detection unit 5 outputs the edge signal indicating the detection of the edge to the control unit 16. Upon receipt of the edge signal, the control unit 16 uses the edge signal as a trigger signal for generation of recording process timing.

Afterwards, the record medium 21 that has passed through the record medium detection unit 5 is conveyed downstream from the conveyance path, and then adsorbed to the conveyance belt 24 of the conveyance mechanism 6.

In addition, the control unit 16 acquires recorded data line by line from the recording process specification information when the recording process is performed and passes the data to the nozzle array control unit 18.

The pulse signal of the rotary encoder in the conveyance information generated by the conveyance information generation unit 8 is also used as a synchronous signal when the recording process is performed by the nozzle arrays 15-1-1 through 15-n-m. That is, the control unit 16 stores in advance in the storage unit 17 the count value of the number of pulse signals corresponding to the above-mentioned distance L as the information about the timing of starting inkjet by the nozzle arrays 15-1-1 through 15-n-m. The nozzle array control unit 18 of the control unit 16 controls the nozzle array drive units 14-1 through 14-n of the image record unit 12 when the number of pulse signals matches the number of pulse signals of the rotary encoder generated by the conveyance information generation unit 8, and jets ink from the nozzle arrays 15-1-1 through 15-n-m to perform the recording process on the record medium 21. The details are described later.

Thus, the record medium 21 after the recording process is passed to the collection unit 9 provided downstream from the conveyance mechanism 6. Then, the record medium 21 is held by the ejection drive unit 11 and further conveyed downstream through the conveyance path, and is finally stored in the storage tray 10.

Next described in detail are the details of the configuration of the nozzle array control unit 18. As described above, the nozzle array control unit 18 sets the condition of determining the drive timing of the nozzle array drive units 14-1 through 14-n according to the job information notified from the higher order device 19, and controls the nozzle array drive units 14-1 through 14-n to perform the recording process on the record medium 21 with the drive timing generated using the condition.

First, the block diagram illustrated in FIG. 9 is described. FIG. 9 is a block diagram of the configuration of the functions of the nozzle array control unit 18.

The nozzle array control unit 18 generates an ink jet timing control signal 35a by a phase locked loop setting unit 31 and a phase locked loop 32. The phase locked loop 32 adjusts the frequency of the ink jet timing control signal 35a according to the pulse signal in the conveyance information generated by the conveyance information generation unit 8. The phase locked loop setting unit 31 makes settings according to the job information notified from the higher order device 19 with respect to the phase locked loop 32.

In the present embodiment, the MPU of the control unit 16 reads the control program from the storage unit 17 and executes the program, thereby configuring the phase locked loop setting unit 31, and the phase locked loop 32 is configured by the ASIC (application specific integrated circuit). It is obvious that the phase locked loop 32 can be configured by an analog circuit. It is also possible to configure the function of the phase locked loop 32 provided by the MPU by generating a signal processing program for directing the MPU to perform the signal processing corresponding to the phase locked loop 32 and storing the program in advance in the storage unit 17 (that is, to configure a so-called digital PLL).

The phase locked loop 32 is configured by a phase comparator 33, a loop filter 34, a voltage control oscillator 35, and a first frequency divider 36.

The phase comparator 33 compares the phase of the pulse signal in the conveyance information generated by the conveyance information generation unit 8 with the phase of a feedback signal 36a described later, and outputs a phase difference signal 33a indicating the phase shift.

The loop filter 34 is configured by, for example, a low pass filter, and converts the phase difference signal 33a into a loop filter output 34a as a signal of a voltage value corresponding to the level of advance or delay of a phase.

Figure 10:
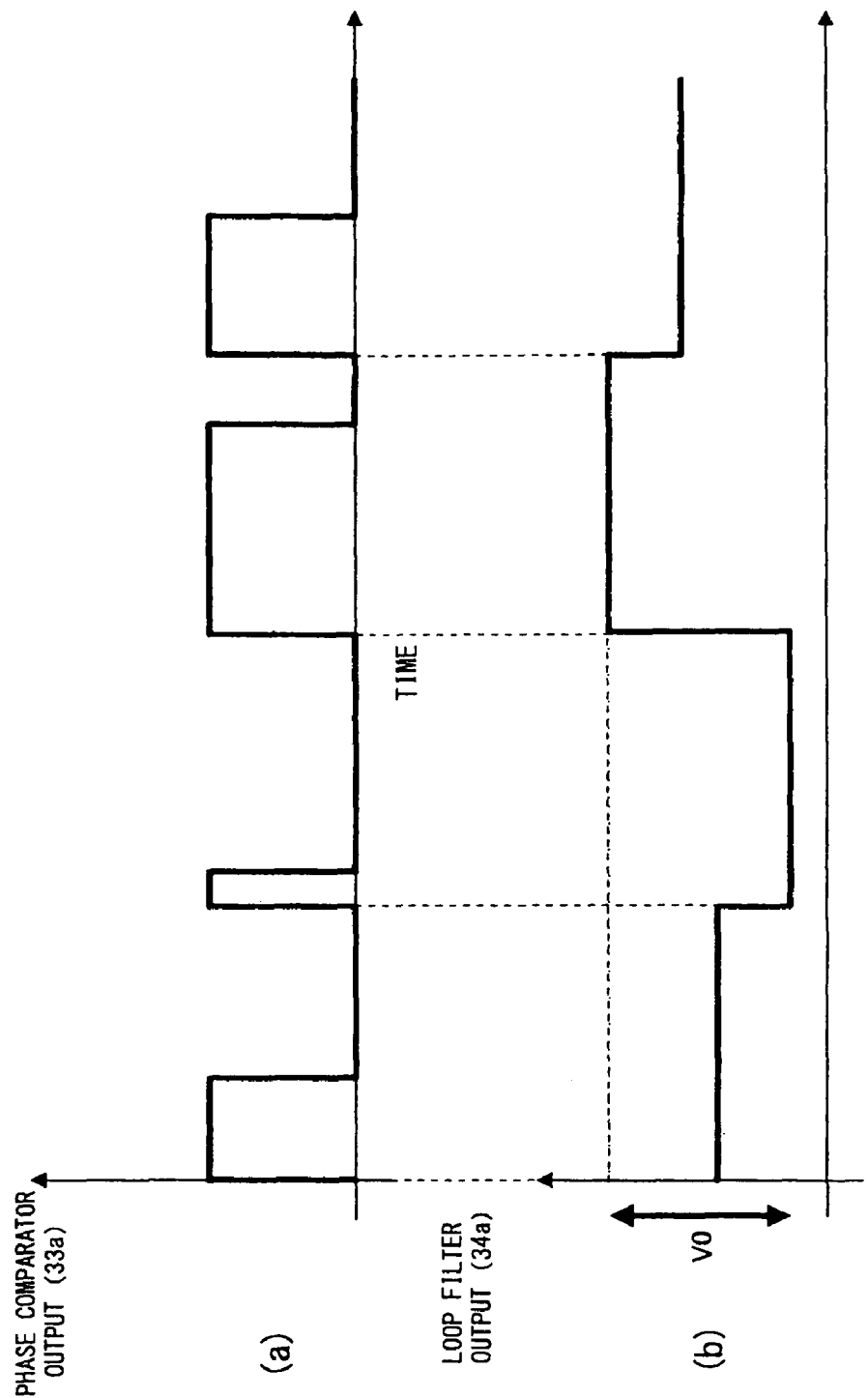
FIG. 10 illustrates the relationship between an input signal and an output signal of a loop filter.

The relationship illustrated in FIG. 10 is described below. FIG. 10 illustrates the relationship between the input signal and the output signal of the loop filter 34.

Part (a) indicates an example of a signal of the phase difference signal 33a as an input signal to the loop filter 34. Thus, the phase difference signal 33a can be a pulse signal having a pulse width corresponding to the level of the phase delay of the feedback signal 36a for the pulse signal in the conveyance information generated by the conveyance information generation unit 8.

Part (b) indicates the loop filter output 34a when the phase difference signal 33a is input to the loop filter 34. The loop filter output 34a can be a signal of a voltage value corresponding to the pulse width of the phase difference signal 33a.

That is, the loop filter output 34a can be a signal of a voltage value corresponding to the level of the phase delay of the feedback signal 36a for the pulse signal as the conveyance information generated by the conveyance information generation unit 8.

The response speed of the phase locked loop 32 is determined by the characteristic of the loop filter 34.

The voltage control oscillator 35 generates a signal of the frequency corresponding to the voltage value of the loop filter output 34a (that is, the information about the comparison result by the phase comparator 33) as the ink jet timing control signal 35a and outputs the signal. The voltage control oscillator 35 is configured by a reference frequency oscillator 37 for outputting a predetermined reference frequency Fd and a second frequency divider 38 for dividing the reference frequency Fd. The frequency division ratio of the second frequency divider 38 is set by the phase locked loop setting unit 31.

The second frequency divider 38 is configured so that the frequency division ratio corresponding to the voltage value of the loop filter output 34a can be set by the phase locked loop setting unit 31. That is, for example, when the loop filter output 34a is the highest voltage VH, the frequency division ratio a (a is a natural number) can be set in the second frequency divider 38, and when the loop filter output 34a is the lowest voltage VL, the frequency division ratio b (b is a natural number) can be set in the second frequency divider 38. In this case, the frequency of the ink jet timing control signal 35a as the output of the voltage control oscillator 35 is Fd/a when the loop filter output 34a is the highest voltage VH, and Fd/b when the loop filter output 34a is the lowest voltage VL. At this time, the lock range of the phase locked loop 32 is Fd/b through Fd/a.

The first frequency divider 36 divides the frequency of the ink jet timing control signal 35a as the output of the 35 and generates the feedback signal 36a. Therefore, a circuit obtained by combining the first frequency divider 36 with the phase comparator 33 compares the phase of the ink jet timing control signal 35a with the phase of the pulse signal in the conveyance information generated by the conveyance information generation unit 8.

With the above-mentioned configuration, the phase locked loop 32 generates the ink jet timing control signal 35a for determining the drive timing of the nozzle array drive units 14-1 through 14-n, controls the frequency of the ink jet timing control signal 35a, and synchronizes the drive timing to the pulse signal in the conveyance information about the record medium 21.

Described next is the generating operation of the ink jet timing control signal 35a by the nozzle array control unit 18.

First, the combination of the values of the frequency division ratios of the second frequency divider 38 appropriate for the conveyance information generated by the conveyance information generation unit 8 is calculated in advance, and the result is stored in the storage unit 17 of the control unit 16 as a data table. When the job information is input, the nozzle array control unit 18 sets a frequency division ratio corresponding to the job information in the second frequency divider 38 of the voltage control oscillator 35.

The example illustrated in FIG. 11 is described below. FIG. 11 illustrates an example of the correspondence between the voltage value of the loop filter output 34a (that is, the information about the comparison result by the phase comparator 33) and the frequency of the output of the voltage control oscillator 35 (that is, the ink jet timing control signal 35a).

In FIG. 11, V-F1 indicates the frequency obtained by dividing the reference frequency Fd by the frequency division ratio a1, b1, c1, . . . , l1 corresponding to each voltage in the voltage change range from the lowest voltage VL to the highest voltage VH of the loop filter output 34a. V-F2 indicates the frequency obtained by dividing the reference frequency Fd by the frequency division ratio a2, b2, c2, . . . , l2 corresponding to each voltage in the voltage change range from the lowest voltage VL to the highest voltage VH. Furthermore, V-F3 and V-F4 indicate similar data. The combination of the frequency division ratios for realization of the V-F characteristic illustrated in FIG. 11 by the voltage control oscillator 35 is stored in advance in the storage unit 17 of the control unit 16 as a data table. The combination of the frequency division ratios is the information for determination of the V-F characteristic of the voltage control oscillator 35, and can be the information for determination of the lock range of the phase locked loop 32.

In FIG. 11, when the V-F characteristic of the voltage control oscillator 35 is V-F1, the signal of the highest frequency fL is output if the lowest voltage VL is input to the voltage control oscillator 35, and the signal of the highest frequency fH is output if the highest voltage VH is input. The range from the highest frequency fL to the highest frequency fH refers to the lock range of the phase locked loop 32 when the V-F characteristic of the voltage control oscillator 35 is V-F1.

FIG. 11 illustrates four sets of V-F characteristics from V-F1 through V-F4, but the characteristics are not limited to the four sets.

Figure 1:
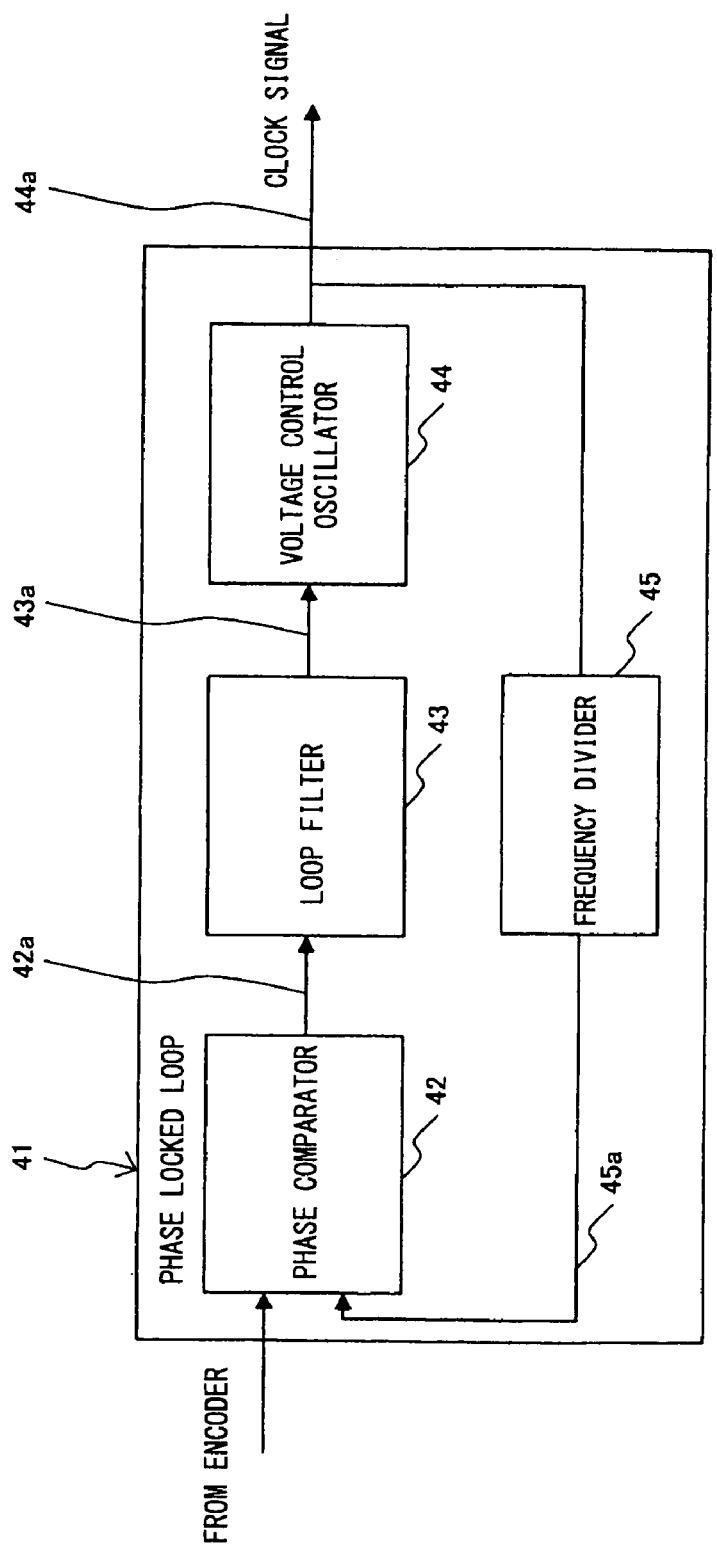
FIG. 1 illustrates a common configuration of a phase locked loop.
Figure 2:
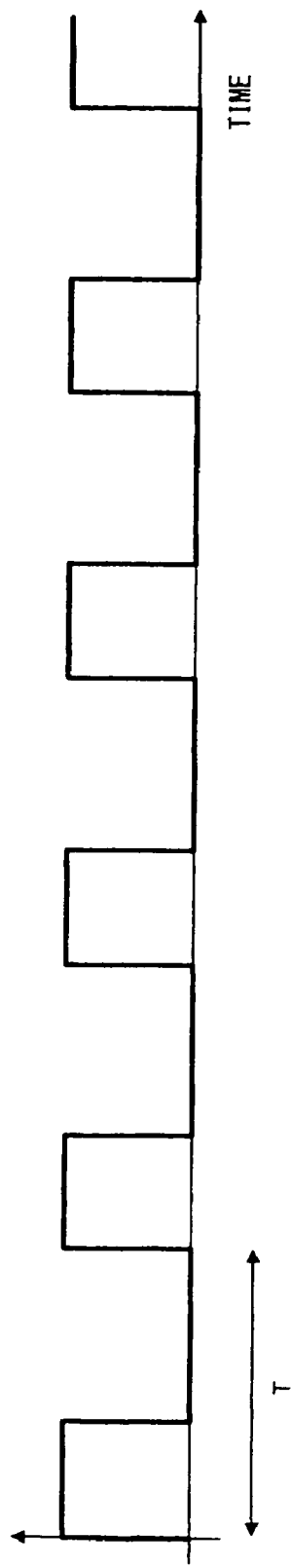
FIG. 2 illustrates an ideal ink jet timing control signal when the conveying speed of a record medium is predetermined.
Figure 3:
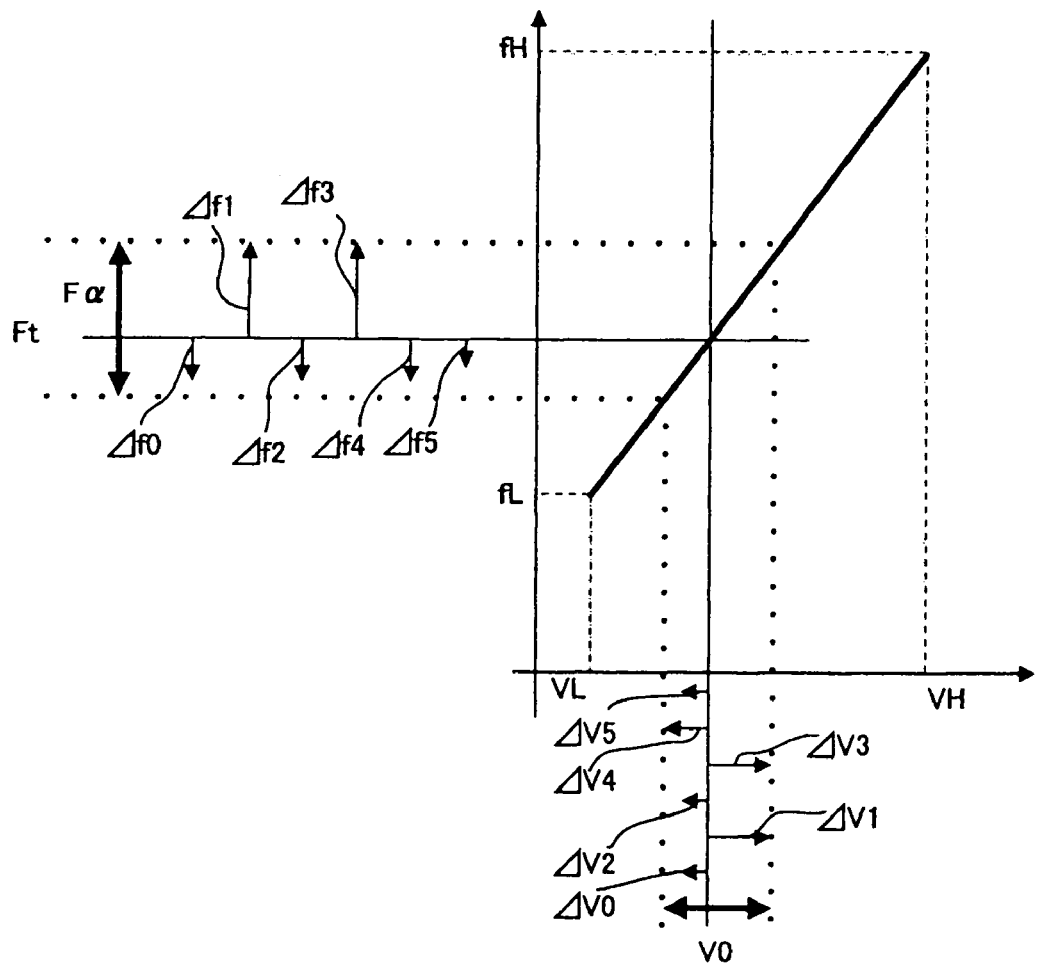
FIG. 3 illustrates an example of the V-F characteristic of the voltage control oscillator illustrated in FIG. 1.
Figure 4:
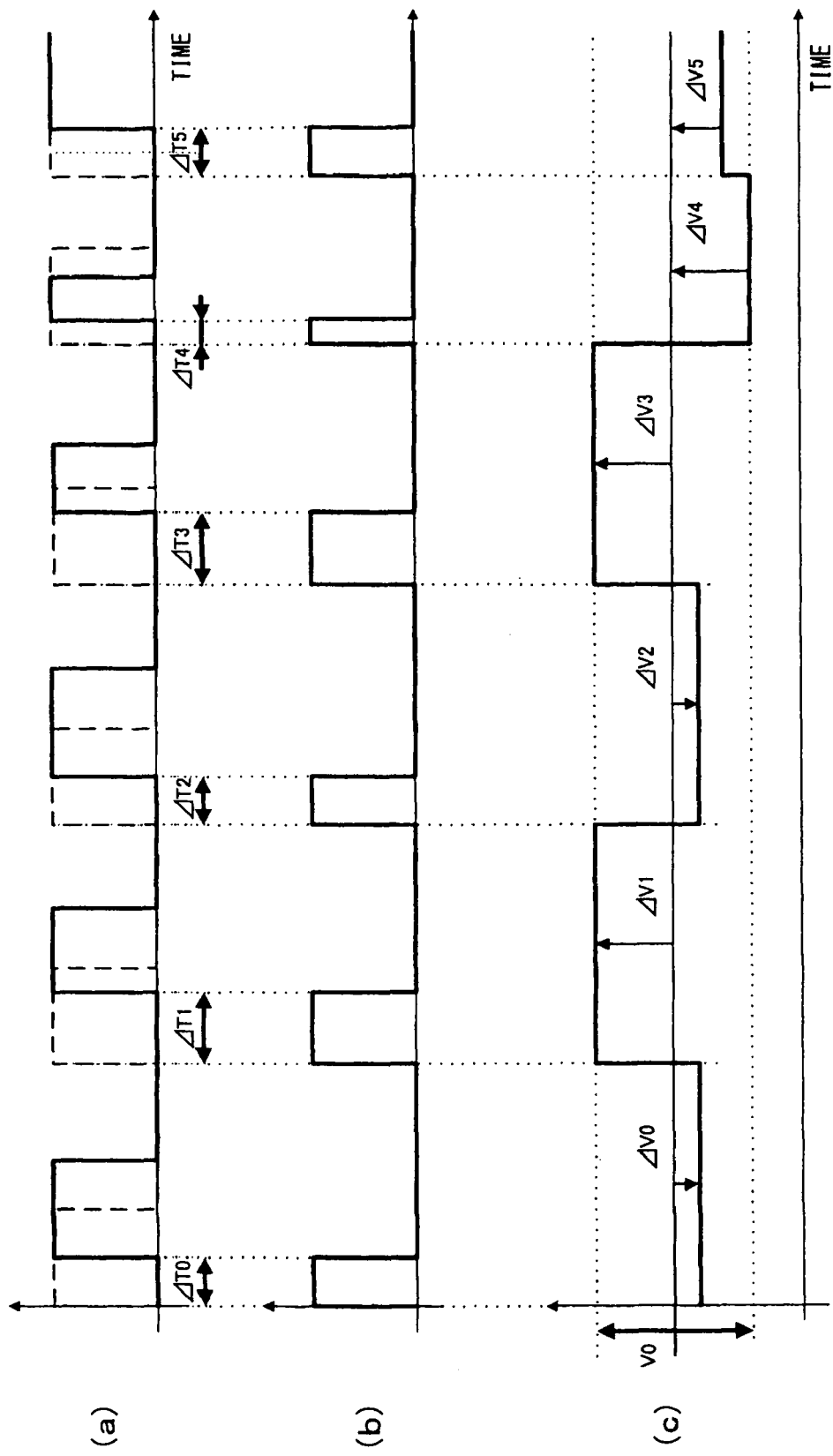
FIG. 4 illustrates the concept indicating the correlation between the signal waveforms of the units of the phase locked loop illustrated in FIG. 1.

The phase locked loop setting unit 31 reads the combination of the frequency division ratios to obtain the optimum V-F characteristic of the voltage control oscillator 35 for the contents of the job information from the data table of the storage unit 17 according to the job information notified from the higher order device 19, and sets the combination in the second frequency divider 38. That is, the image recording apparatus 1 utilizes the recording operation mode at different conveying speeds of the record medium 21 by switching the V-F characteristic of the voltage control oscillator 35 according to the job information. Thus, when the lock range of the phase locked loop 32 is divided, the tilts of the V-F characteristics illustrated in FIG. 11 become more moderate than those according to the conventional technology illustrated in FIG. 3.

The Fα in FIG. 11 indicates the frequency fluctuation range of the output signal of the voltage control oscillator 35 for the voltage fluctuation range V0 of the loop filter output 34a illustrated in FIG. 10 in the case where the V-F characteristic of the voltage control oscillator 35 is V-F1. As described above, by moderating the tilt of the V-F characteristic, the Fα becomes smaller than the conventional value. In the image recording apparatus 1 according to the present embodiment, the jitter component included in the ink jet timing control signal 35a as the output of the voltage control oscillator 35 can be smaller by dividing and reducing the lock range of the phase locked loop 32.

As described above, the phase locked loop setting unit 31 sets the information about the determination of the lock range of the phase locked loop 32 in the phase locked loop 32 according to the job information as the condition of determining the drive timing.

Described next is the control process performed by the control unit 16 to change the V-F characteristic of the voltage control oscillator 35. FIG. 12 is a flowchart of the contents of the process.

The process illustrated in FIG. 12 is realized by the MPU reading and executing the control program stored in advance in the storage unit 17 of the control unit 16, and the control unit 16 functions as the phase locked loop setting unit 31 of the nozzle array control unit 18 by the MPU executing the control program.

When the process illustrated in FIG. 12 starts, the control unit 16 first performs the process of determining whether or not the job information is received from the higher order device 19 in step S1. If the control unit 16 determines that the job information is received (YES as a determination result), the unit passes control to step S2. If the control unit 16 determines that the job information is not received (NO as a determination result), the process in step S1 is repeated until it is determined that the job information is received (until the determination result is YES).

Next, when the control unit 16 receives the job information, the control unit 16 sets the conveying speed V of a record medium on the basis of the resolution and the density specified in the job information. The conveying speed V can be obtained by a prepared data table or calculated. Next, the control unit 16 performs the process of retrieving the frequency division ratio at which the voltage control oscillator 35 can output a predetermined ink jet timing control signal 35a from the data table of the storage unit 17.

The data table stores in advance the combination (set values) of four sets of the frequency division ratios of the second frequency divider 38, which are to be realized the V-F characteristic illustrated in FIG. 11 by the voltage control oscillator 35, and the conveying speeds V of a record medium, which are set on the basis of the resolution and the density specified in the job information, corresponding to each other. Therefore, the control unit 16 refers to the range of the resolution indicated by the data table, and performs the process of retrieving the resolution in the range specified in the notified job information.

The frequency Ft [Hz] of the ink jet timing control signal 35a required to record an image with the resolution [dpi] indicated in the job information can be obtained by the following equation where V [mm/s] is the conveying speed of the record medium 21.

$$Ft = 25.4/V \times (\text{resolution}) \times (\text{frequency division ratio of first frequency divider 36})$$

where the constant "25.4" is the length in the unit of millimeter of 1 inch.

The control unit 16 determines in step S2 whether or not the resolution indicated in the job information is in the resolution range associated with the first set value in the four sets of set values stored in the data table. When the control unit 16 determines that the job information corresponds to the first set value (determination result is YES), then the unit sets the first set value in the second frequency divider 38 of the voltage control oscillator 35 in step S3, and afterwards control is passed to step S9. On the other hand, when the control unit 16 determines that the job information does not correspond to the first set value (determination result is NO), the unit passes control to step S4.

Next, in step S4, the control unit 16 determines whether or not the resolution indicated in the job information is in the resolution range associated with the second set value in the four sets of set values stored in the data table. When the control unit 16 determines that the job information corresponds to the second set value (determination result is YES), the unit sets in step S5 the second set value in the second frequency divider 38 of the voltage control oscillator 35, and then passes control to step S9. On the other hand, when the control unit 16 determines that the job information does not correspond to the second set value (determination result is NO), the unit passes control to step S6.

Next, in step S6, the control unit 16 determines whether or not the resolution indicated in the job information is in the resolution range associated with the third set value in the four sets of set values stored in the data table. When the control unit 16 determines that the job information corresponds to the third set value (determination result is YES), the unit sets in step S7 the third set value in the third frequency divider 38 of the voltage control oscillator 35, and then passes control to step S9. On the other hand, when the control unit 16 determines that the job information does not correspond to the third set value (determination result is NO), the unit passes control to step S8.

Next, in step S8, the control unit 16 determines that the resolution indicated in the job information is in the resolution range associated with the fourth set value in the four sets of set values stored in the data table, sets the fourth set value in the second frequency divider 38 of the voltage control oscillator 35, and afterwards passes control to step S9.

Next, in step S9, the control unit 16 controls the voltage control oscillator 35, starts outputting the ink jet timing control signal 35a, and then terminates the control process illustrated in FIG. 8.

The control unit 16 functions as the phase locked loop setting unit 31 of the nozzle array control unit 18 by directing the MPU of the control unit 16 to perform the above-mentioned control process, and switches the V-F characteristic of the voltage control oscillator 35. As a result, the nozzle array control unit 18 controls the nozzle array drive units 14-1 through 14-n with the drive timing determined by the ink jet timing control signal 35a generated by the phase locked loop 32 to perform the recording process on the record medium 21.

In the above-mentioned present embodiment, the lock range of the phase locked loop 32 is switched to the optimum value according to the job information notified from the higher order device 19. According to the present embodiment, the above-mentioned process can generate the ink jet timing control signal 35a having a small jitter component and a stable frequency even in the cases where the conveying speeds of the record medium 21 are largely different. Thus, the image recording apparatus 1 according to the present embodiment can perform a recording process with a small shift of a recording position.

The present invention can form various embodiments by appropriately combining a plurality of components disclosed by the present embodiment. For example, some component can be deleted from the entire configuration of the present embodiment, and the components according to different embodiments can be appropriately combined.

In addition, the embodiments of the present invention are not limited to the above-mentioned embodiments, but an embodiment can be realized by transforming a component within the gist of the present invention at an embodying step.

What is claimed is:

1. An image recording apparatus having a conveyance mechanism for generating conveyance information about a record medium when the record medium is conveyed, and at least one recording unit obtained by providing at least one nozzle array formed in a direction orthogonal to the conveyance direction of the record medium using a plurality of nozzles to perform a recording process by a nozzle array drive unit of the recording unit driving the plurality of nozzles to jet ink, the apparatus comprising:
    a phase locked loop for generating an ink jet timing control signal determining drive timing of the nozzle array drive unit according to notified job information, controlling a frequency of the ink jet timing control signal, and allowing the drive timing to be synchronous with a conveyance distance of the record medium in the conveyance information; and
    a phase locked loop setting unit for setting information determining a lock range of the phase locked loop in the phase locked loop according to the job information as a condition for determining the drive timing, wherein
    the recording process is performed by controlling the nozzle array drive unit with the drive timing determined by the ink jet timing control signal generated by the phase locked loop.

2. The apparatus according to claim 1, wherein:
    the job information includes information about a resolution in the recording process; and
    the phase locked loop setting unit sets the information determining the lock range of the phase locked loop in the phase locked loop on a basis of the resolution.

3. The apparatus according to claim 2, further comprising a storage unit storing in advance a data table in which the resolution is associated with the information determining the lock range of the phase locked loop, wherein
    the phase locked loop setting unit sets the information associated with the resolution indicated in the information included in the job information in the phase locked loop.

4. The apparatus according to claim 1, wherein
    the phase locked loop comprises:
        an oscillator generating the ink jet timing control signal; and
        a phase comparator comparing a phase of the ink jet timing control signal with a phase of a pulse signal generated each time the record medium is conveyed for a predetermined conveyance distance, wherein
    the oscillator changes a frequency of the generated ink jet timing control signal according to information about a comparison result by the phase comparator, and
    the phase locked loop setting unit sets information about a correspondence between the information about the comparison result by the phase comparator and the frequency of the ink jet timing control signal generated by the oscillator as the information determining the lock range of the phase locked loop in the oscillator according to the job information.

5. The apparatus according to claim 4, wherein
the oscillator comprises:
   a reference frequency signal oscillator generating a signal of a predetermined reference frequency; and
   a frequency divider dividing a signal generated by the reference frequency signal oscillator by a frequency division ratio corresponding to the information about the comparison result by the phase comparator to set the signal as the ink jet timing control signal, wherein
the phase locked loop setting unit sets information about a correspondence between the information about the comparison result by the phase comparator and the frequency division ratio of the frequency divider as the information determining the lock range of the phase locked loop in the oscillator on a basis of the job information.

6. The apparatus according to claim 1, further comprising a control unit having the phase locked loop setting unit, wherein
the control unit comprises:
   an arithmetic operation device; and
   a storage unit storing in advance a control program, and
the control unit functions as the phase locked loop setting unit by directing the arithmetic operation device to execute the control program.

7. A control method of an image recording apparatus having a conveyance mechanism for generating conveyance information about a record medium when the record medium is conveyed, and at least one recording unit obtained by providing at least one nozzle array formed in a direction orthogonal to the conveyance direction of the record medium using a plurality of nozzles to perform a recording process by a nozzle array drive unit of the recording unit driving the plurality of nozzles to jet ink, wherein:
   the image recording apparatus further comprises a phase locked loop for generating an ink jet timing control signal determining drive timing when the nozzle array drive unit is controlled to perform the recording process, controlling a frequency of the ink jet timing control signal, and allowing the drive timing to be synchronous with a conveyance distance of the record medium in the conveyance information; and
   the method comprises:
      setting a generation condition when the phase locked loop generates the ink jet timing control signal in the phase locked loop on a basis of notified job information; and
      performing the recording process by controlling the nozzle array drive unit with the drive timing determined by the ink jet timing control signal generated by the phase locked loop.

8. The method according to claim 7, wherein:
the job information includes information about a resolution in the recording process; and
in setting the generation condition, the information determining the lock range of the phase locked loop is set in the phase locked loop on a basis of the resolution.

9. The method according to claim 8, wherein:
the image recording apparatus further comprises a storage unit storing in advance a data table in which the resolution is associated with the information determining the lock range of the phase locked loop; and
in setting the generation condition, the information associated with the resolution indicated in the information included in the job information is set in the phase locked loop.

10. The method according to claim 7, wherein
the phase locked loop comprises:
   an oscillator generating the ink jet timing control signal; and
   a phase comparator comparing a phase of the ink jet timing control signal with a phase of a pulse signal generated each time the record medium is conveyed for a predetermined conveyance distance, wherein
the oscillator changes a frequency of the generated ink jet timing control signal according to information about a comparison result by the phase comparator, and
in setting the generation condition, information about a correspondence between the information about the comparison result by the phase comparator and the frequency of the ink jet timing control signal generated by the oscillator is set as the information determining the lock range of the phase locked loop in the oscillator according to the job information.

11. The method according to claim 10, wherein
the oscillator comprises:
   a reference frequency signal oscillator generating a signal of a predetermined reference frequency; and
   a frequency divider dividing a signal generated by the reference frequency signal oscillator by a frequency division ratio corresponding to the information about the comparison result by the phase comparator to set the signal as the ink jet timing control signal, wherein
in setting the generation condition, information about a correspondence between the information about the comparison result by the phase comparator and the frequency division ratio of the frequency divider is set as the information determining the lock range of the phase locked loop in the oscillator on a basis of the job information.

12. A storage medium storing a program used to direct an arithmetic operation device to control an image recording apparatus having a conveyance mechanism for generating conveyance information about a record medium when the record medium is conveyed, and at least one recording unit obtained by providing at least one nozzle array formed in a direction orthogonal to the conveyance direction of the record medium using a plurality of nozzles to perform a recording process by a nozzle array drive unit of the recording unit driving the plurality of nozzles to jet ink, wherein:
   the image recording apparatus comprises a phase locked loop for generating an ink jet timing control signal determining drive timing when the nozzle array drive unit is controlled to perform the recording process, controlling a frequency of the ink jet timing control signal, and allowing the drive timing to be synchronous with a conveyance distance of the record medium in the conveyance information; and
   the program directs the arithmetic operation device to perform the processes of:
      setting a generation condition when the phase locked loop generates the ink jet timing control signal in the phase locked loop on a basis of notified job information; and
      performing the recording process by controlling the nozzle array drive unit with the drive timing determined by the ink jet timing control signal generated by the phase locked loop.

13. The storage medium according to claim 12, wherein:
the job information includes information about a resolution in the recording process; and in setting the generation condition, the information determining the lock range of the phase locked loop is set in the phase locked loop on a basis of the job information.

14. The storage medium according to claim 13, wherein:

the image recording apparatus further comprises a storage unit storing in advance a data table in which the resolution is associated with the information determining the lock range of the phase locked loop; and in setting the generation condition, the information associated with the resolution indicated in the information included in the job information is set in the phase locked loop.

15. The storage medium according to claim 12, wherein the phase locked loop comprises:

an oscillator generating the ink jet timing control signal; and a phase comparator comparing a phase of the ink jet timing control signal with a phase of a pulse signal generated each time the record medium is conveyed for a predetermined conveyance distance, wherein the oscillator changes a frequency of the generated ink jet timing control signal according to information about a comparison result by the phase comparator, and in setting the generation condition, information about a correspondence between the information about the comparison result by the phase comparator and the frequency of the ink jet timing control signal generated by the oscillator is set as the information determining the lock range of the phase locked loop in the oscillator according to the job information.

16. The storage medium according to claim 15, wherein the oscillator comprises:

a reference frequency signal oscillator generating a signal of a predetermined reference frequency; and a frequency divider dividing a signal generated by the reference frequency signal oscillator by a frequency division ratio corresponding to the information about the comparison result by the phase comparator to set the signal as the ink jet timing control signal, wherein in setting the generation condition, information about a correspondence between the information about the comparison result by the phase comparator and the frequency division ratio of the frequency divider is set as the information determining the lock range of the phase locked loop in the oscillator on a basis of the job information.

* * * * *